US008376265B2

(12) United States Patent
Desroche

(10) Patent No.: US 8,376,265 B2
(45) Date of Patent: *Feb. 19, 2013

(54) AIRCRAFT STABILIZER SYSTEM AND METHODS OF USING THE SAME

(75) Inventor: Robert J. Desroche, Everett, WA (US)

(73) Assignee: BLR Aerospace, L.L.C., Everett, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/485,623

(22) Filed: May 31, 2012

(65) Prior Publication Data

US 2012/0256041 A1    Oct. 11, 2012

Related U.S. Application Data

(62) Division of application No. 12/152,661, filed on May 14, 2008, now Pat. No. 8,210,468.

(60) Provisional application No. 60/930,233, filed on May 14, 2007.

(51) Int. Cl.
*B64C 27/00* (2006.01)

(52) U.S. Cl. ........... 244/17.11; 244/88; 244/89; 244/91; 29/897.2; 29/402.03; 29/402.08

(58) Field of Classification Search .................. 244/1 R, 244/17.11, 17.17, 87–89, 90 A, 90 B, 90 R, 244/91; 29/897.2, 402.03, 402.08
See application file for complete search history.

(56) References Cited

U.S. PATENT DOCUMENTS

| | | | |
|---|---|---|---|
| 2,338,935 A | 1/1944 | Hafner | |
| 2,626,766 A | 1/1953 | McDonald | |
| 2,674,421 A | 4/1954 | De Cenzo | |
| 2,862,361 A | 12/1958 | Koup | |
| 2,959,373 A | 11/1960 | Zuck | |
| 3,540,680 A | 11/1970 | Peterson | |
| 3,807,662 A | 4/1974 | Velazquez | |
| 3,966,145 A | 6/1976 | Wiesner | |
| 4,200,252 A | 4/1980 | Logan et al. | |
| 4,227,665 A | 10/1980 | Carlson et al. | |
| 4,708,305 A | 11/1987 | Kelley et al. | |
| 5,209,430 A | 5/1993 | Wilson et al. | |
| D425,853 S | 5/2000 | Caporaletti | |
| 6,352,220 B1 * | 3/2002 | Banks et al. | 244/17.19 |
| 6,869,045 B1 | 3/2005 | Desroche | |
| 7,063,289 B2 | 6/2006 | Desroche | |
| 8,074,926 B2 * | 12/2011 | Baker | 244/93 |
| 2008/0149762 A1 * | 6/2008 | Baker | 244/87 |
| 2012/0091268 A1 * | 4/2012 | Baker | 244/89 |

OTHER PUBLICATIONS http://www.scalehelis.com/flyin/vert/vert12.jpg, retrieved from http://www.web.archive.org on Sep. 11, 2008, 1 pg.
http://www.scalehelis.com/flyin/vert/vert.html, retrieved from http://www.web.archive.org on Sep. 11, 2008, 3 pgs.
PCT International Search Report and Written Opinion from counterpart PCT/US2008/006254, 13 pages.

* cited by examiner

*Primary Examiner* — Philip J Bonzell
(74) *Attorney, Agent, or Firm* — Seed IP Law Group PLLC

(57) ABSTRACT

An aircraft can include a tail section and a stabilizing system coupled to the tail section. The stabilizing system has a vertical stabilizer and at least one strake that cooperate to generate forces that compensate for a reaction torque generated by a main lifting rotor that produces lifting forces when the aircraft is in flight. Methods for improving aircraft performance include installing the at least one strake and retrofitting of a vertical stabilizer to increase thrust forces produced by a tail rotor.

13 Claims, 15 Drawing Sheets

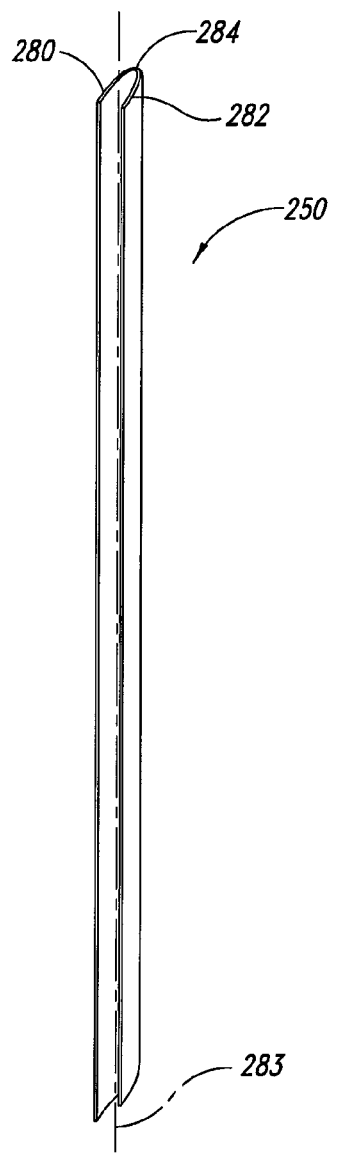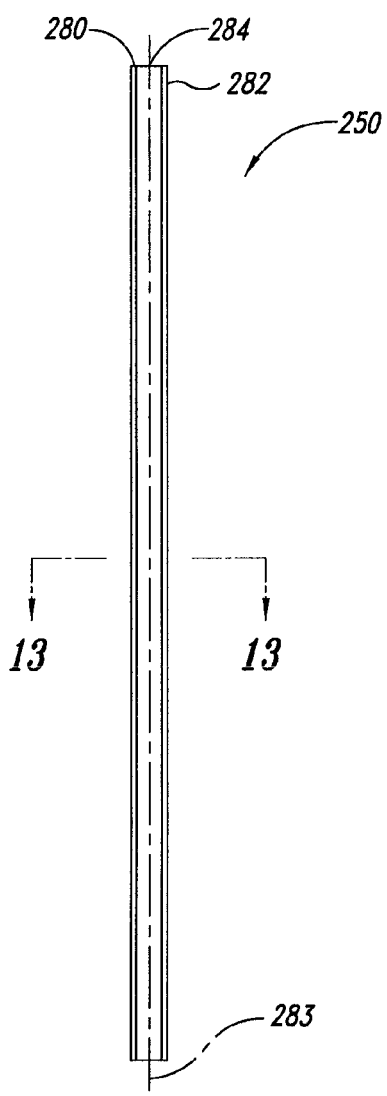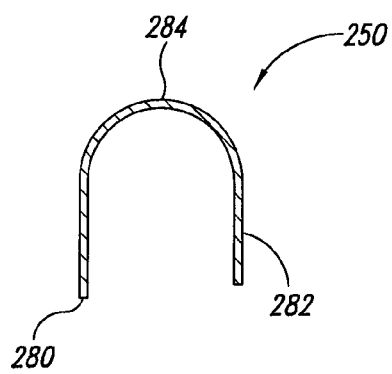
FIG. 11
FIG. 12
FIG. 13

AIRCRAFT STABILIZER SYSTEM AND METHODS OF USING THE SAME

CROSS-REFERENCE TO RELATED APPLICATION

This application is a divisional of U.S. patent application Ser. No. 12/152,661 filed May 14, 2008, which claims the benefit under 35 U.S.C. §119(e) of U.S. Provisional Patent Application No. 60/930,233 filed May 14, 2007. Each of these applications is incorporated herein by reference in their entirety.

BACKGROUND

1. Technical Field

The present disclosure generally relates to aircraft with stabilizer systems, and more specifically to helicopters with stabilizer systems that alter the aerodynamics of the helicopter.

2. Description of the Related Art

Traditional single rotor helicopters have a main lifting rotor for providing a lifting force and a tail rotor for providing a laterally directed force used to adjust yaw alignment. Tail rotors are often positioned next to a vertically oriented stabilizer at a rearward end of a tail boom. It may be difficult to maintain the proper heading of the helicopter because a reaction torque generated by rotation of the main lifting rotor tends to cause unwanted rotation of a fuselage of the helicopter. For example, counterclockwise rotation of the main lifting rotor, when viewed from above, causes a reaction torque that tends to rotate the fuselage of the helicopter in the clockwise direction. Rotation of the tail rotor produces a laterally directed thrust force for counteracting the reaction torque. Unfortunately, the vertically oriented stabilizer may block the airflow generated by the tail rotor resulting in a reduced thrust force, which may significantly reduce helicopter performance and efficiency.

BRIEF SUMMARY

At least some embodiments disclosed herein include an aircraft that has a stabilizer system for improved performance. The stabilizer system includes a vertical stabilizer with a relatively small profile, as viewed from the side, as compared to profiles of traditional stabilizers. The vertical stabilizer can allow a tail rotor of the aircraft to produce relatively large thrust forces for counteracting reaction torques. The stabilizer system may further include one or more airflow modifiers, such as strakes, mounted on a tail section of the aircraft. In some embodiments, the aircraft has a plurality of airflow modifiers that cooperate with the reduced profile vertical stabilizer to provide increased aircraft maneuverability.

In some embodiments, an aircraft includes a tail section and a stabilizing system permanently or temporarily coupled to the tail section. The stabilizing system includes a vertical stabilizer and at least one strake. The vertical stabilizer and the at least one strake cooperate to generate forces that compensate for a reaction torque generated by a main lifting rotor.

In some embodiments, a stabilizer at a rearward end of a tail boom of an aircraft is retrofitted with a new trailing edge to reduce the size of the stabilizer. For example, a trailing edge of the stabilizer can have a gradually tapered V-shape as viewed from above. The V-shaped trailing edge is replaced with a new trailing edge having a different configuration. The new trailing edge can have a relatively round shape to reduce a chord length of at least a portion of the stabilizer. In some embodiments, the stabilizer is a vertically oriented fin-type stabilizer. The stabilizer can have an upper fin extending upwardly from the tail boom and a lower fin extending downwardly from the tail boom.

The stabilizer can be retrofitted aftermarket to change helicopter performance. For example, the stabilizer can be retrofitted with the new trailing edge to reduce the surface area of the stabilizer to increase thrust forces generated by the tail rotor suitable for counteracting a reaction torque caused at least in part by rotation of a main lifting rotor. Advantageously, less power is used to operate the tail rotor as compared to the power used prior to the retrofitting. Alternatively, the entire stabilizer may be replaced with a reduced profile stabilizer. Accordingly, different aftermarket retrofitting processes can be performed to adjust the aerodynamics of aircraft.

In some embodiments, a method of modifying a vertical stabilizer of a helicopter is provided. The method comprises removing a V-shaped upper trailing edge of an upper fin of the vertical stabilizer. The upper fin extends upwardly from a tail boom of the helicopter. A new upper trailing edge is formed. A V-shaped lower trailing edge of a lower fin of the vertical stabilizer is removed. The lower fin extends downwardly from the tail boom of the helicopter. A new lower trailing edge is formed. The vertical stabilizer can be directly or indirectly coupled to the tail boom.

The new upper and lower trailing edges can be formed simultaneously or at different times. In some embodiments, the new upper trailing edge is formed by permanently or temporarily coupling a U-shaped upper trailing edge section to a main body of the vertical stabilizer. After the U-shaped upper trailing edge section is coupled to the main body, a U-shaped lower trailing edge section is coupled to the main body. In some embodiments, a unitary member defines both the new upper and lower trailing edges. The unitary member can include a U-shaped upper portion and a U-shaped lower portion.

In some embodiments, a method of modifying a stabilizer of a helicopter is provided. The method comprises removing a sharp upper trailing edge of an upper fin of the stabilizer. The upper fin extends upwardly from a free end of a tail boom of the helicopter. A new upper trailing edge is provided on the upper fin. A sharp lower trailing edge of a lower fin of the stabilizer is removed. The lower fin extends downwardly from the free end of the tail boom of the helicopter. A new lower trailing edge is provided on the lower fin.

In some embodiments, a method of modifying an aircraft comprises providing a vertical stabilizer that includes a non-rounded trailing edge, such as a sharp V-shaped trailing edge. A portion of the vertical stabilizer has a first average chord length. The non-rounded trailing edge is replaced with a rounded trailing edge such that the portion of the vertical stabilizer has a second average chord length that is less than the first average chord length. In some embodiments, the second average chord length is less than 70%, 80%, 90%, or 95% of the first average chord length. In some embodiments, the non-rounded trailing edge is removed by cutting away a rearward portion of the vertical stabilizer. In other embodiments, the vertical stabilizer has a separate component that defines the non-rounded trailing edge. Various techniques can be used to remove the non-rounded trailing edge. That component can be conveniently separated from a main body of the vertical stabilizer.

In some embodiments, a helicopter comprises a fuselage, a main lifting rotor rotatable relative to the fuselage, a tail boom extending outwardly from the fuselage, and a tail rotor at a free end of the tail boom. The tail rotor rotates about a tail rotor axis of rotation. The helicopter further includes a vertical stabilizer comprising an upper fin extending upwardly from the tail rotor axis of rotation and a lower fin extending downwardly from the tail rotor axis of rotation. A portion of the vertical stabilizer forms a leading edge having a leading edge radius, and another portion of the vertical stabilizer forms a trailing edge having a trailing edge radius such that a ratio of the leading edge radius to the trailing edge radius is in a range of about 0.5 to about 1.2. In some embodiments, the tail rotor axis of rotation extends through a central region of the vertical stabilizer such that the free end of the tail boom is interposed between the central region and the tail rotor.

In some embodiments, a vertical stabilizer for a helicopter includes an upper fin and a lower fin. The upper fin is adapted to extend upwardly from a tail boom of the helicopter. The lower fin is connected to the upper fin and is adapted to extend downwardly from the tail boom. A first portion of the vertical stabilizer forms a leading edge that extends along both the upper fin and the lower fin. A second portion of the vertical stabilizer forms a trailing edge that extends along both the upper fin and the lower fin. For example, the leading edge and trailing edge can extend from an upper tip to a lower tip of the vertical stabilizer.

BRIEF DESCRIPTION OF THE SEVERAL VIEWS OF THE DRAWINGS

In the drawings, identical reference numbers identify similar elements or acts.

FIG. 11 is an isometric view of an upper portion of the trailing edge section of FIG. 10.

FIG. 12 is a front elevational view of the upper portion of FIG. 11.

FIG. 13 is a cross-sectional view of the upper portion of FIG. 12 taken along line 13-13.

DETAILED DESCRIPTION

In the following description, certain specific details are set forth in order to provide a thorough understanding of various embodiments of the invention. However, one skilled in the art will understand that the invention may be practiced without these details. Stabilizing systems are disclosed in the context of tail sections of helicopters because they have particular utility in this context. However, the stabilizing systems can be incorporated into other types of aircraft in which aerodynamics is a significant consideration. Terms, such as "rear," "front," "rearward," "forward," "counter clockwise," "clockwise," "upward," and "downward," and variations thereof are used to describe the illustrated embodiments and are used consistently with the description of non-limiting exemplary applications. It will be appreciated, however, that the illustrated embodiments can be located or oriented in a variety of desired positions.

Unless the context requires otherwise, throughout the specification and claims which follow, the word "comprise" and variations thereof, such as, "comprises" and "comprising" are to be construed in an open, inclusive sense, that is as "including, but not limited to."

Figure 1:
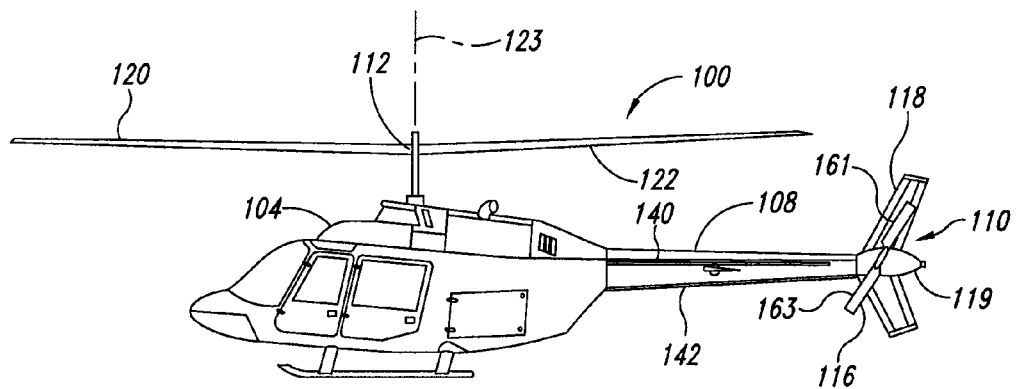
FIG. 1 is a side elevational view of a helicopter with a stabilizer system, in accordance with one illustrated embodiment.

FIG. 1 shows a helicopter 100 including a cabin fuselage section 104 and a tail section 108 connected to and extending outwardly from the cabin fuselage section 104. A stabilizer system 110 includes a vertical stabilizer 118 fixedly coupled to a free end 119 of the tail section 108 and a pair of air flow modifiers 140, 142, illustrated as strakes, positioned between the cabin fuselage section 104 and a tail rotor 116. The tail rotor 116 is rotatably coupled to the free end 119 of the tail section 108.

The cabin fuselage section 104 includes a main lifting rotor 112 for providing a lifting force. The illustrated main lifting rotor 112 includes a pair of rotor blades 120, 122 rotatable about a main lifting rotor axis of rotation 123. When the main lifting rotor 112 rotates about the axis of rotation 123, a lifting force is generated to keep the helicopter 100 in flight. This rotation of the main lifting rotor 112 also generates a reaction torque that causes rotation of the cabin fuselage 104 in the opposite direction. For example, if the main lifting rotor 112 of FIG. 2 rotates in a counter clockwise direction about the axis of rotation 123 (indicated by the arrows 126), a reaction torque tends to move the cabin fuselage section 104 in the clockwise direction about the axis of rotation 123 (indicated by an arrow 128). The tail rotor 116 rotates about a tail rotor axis of rotation 130 to generate a thrust force that at least partially counteracts the reaction force.

Figure 2:
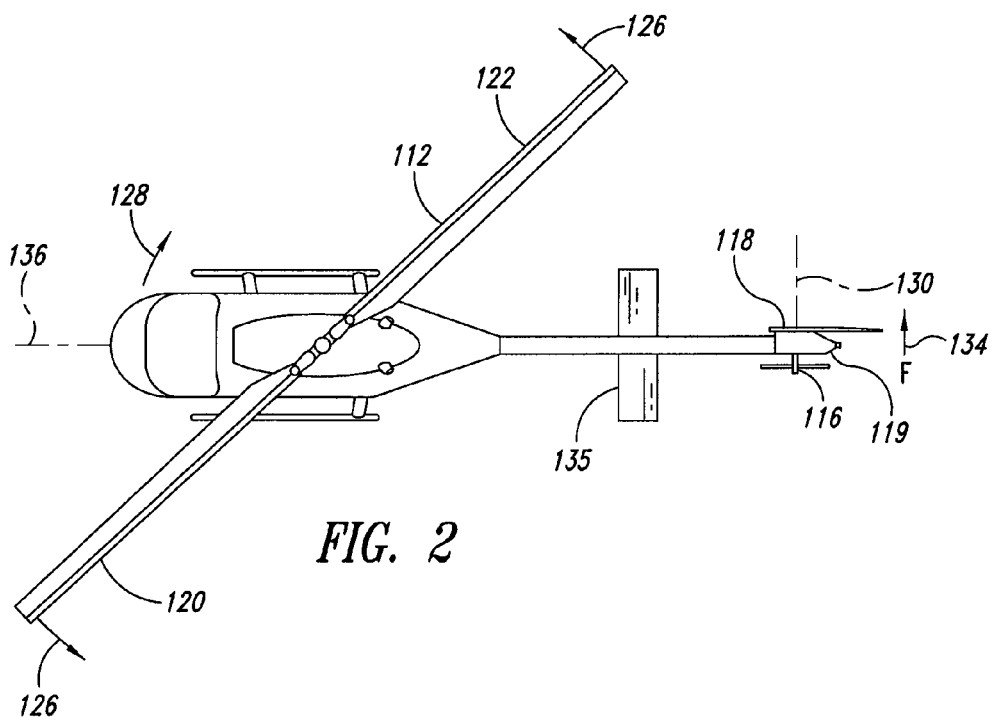
FIG. 2 is a plan view of the helicopter of FIG. 1.

The illustrated tail rotor 116 of FIG. 2 can generate a force F (indicated by the arrow 134) that is generally perpendicular to a vertical midplane 136 of the helicopter 100. When the tail rotor 116 rotates, air is drawn around the vertical stabilizer 118 towards the rotating tail rotor 116. The air then flows past the rotating tail rotor 116. If the trail rotor 116 is located on the other side of the vertical stabilizer 118, the tail rotor 116 can push air towards the vertical stabilizer 118. The air then flows around and away from the vertical stabilizer 118. If the main lifting rotor 112 rotates in the clockwise direction, the tail rotor 116 can be configured to generate a thrust force in the opposite direction.

Referring to FIGS. 1 and 2, the upper strake 140 and the lower strake 142 alter the flow of downwash from the rotating main lifting rotor 112 so as to generate a compensation force that at least partially counteracts the reaction torque produced by rotation of the main lifting rotor 112. In the illustrated embodiment, a horizontal stabilizer 135 of the tail section 108 is positioned between the upper strake 140 and the lower strake 142.

The vertical stabilizer 118 can be positioned laterally next to the tail rotor 116 and can be generally parallel to the midplane 136 of the helicopter 100. In other embodiments, the vertical stabilizer 118 can be slightly angled with respect to the midplane 136. The vertical stabilizer 118 can have a relatively small profile, as viewed from the side, to reduce blockage of airflow produced by the tail rotor 116, thereby increasing the thrust force F. This increased force F can help the pilot control the pitch of the tail rotor 116 maintain a desired orientation of the cabin fuselage section 104 for a desired flight path. To maintain a constant heading when hovering or during takeoff/approach, the pilot can operate tail rotor pedals to adjust the pitch of tail rotor blades 161, 163 to compensate for the torque generated by the main lifting rotor 112. Because the vertical stabilizer 118 blocks a reduce amount of air, the force F generated by the tail rotor 116 can be relatively large, thus reducing tail rotor pedal input.

The components of the stabilizer system 110 cooperate to achieve the desired aircraft performance. The illustrated upper and lower strakes 140, 142 and the vertical stabilizer 118 can cooperate to improve handling of the helicopter 100 (e.g., increased cross wind tolerance), reduce fatigue (e.g., tail boom fatigue, fuselage fatigue, and the like), improve climb performance, improve cruise performance, increase control safety margins, combinations thereof, and the like. For example, the stabilizer system 110 may raise the helicopter's hover ceiling a desired amount. The illustrated stabilizer system 110 is well suited to raise the hover ceiling of the helicopter 100 at least 5,000 ft to about 6,000 ft. Additionally, because less power is used to operate the trail rotor 116, more power generated by the helicopter engine can be used to generate vertical lift, thereby increasing the payload of the helicopter 100 at a given altitude. Improved handling can include increased cross wind tolerance, improved safety margins, and the like.

Figure 3:
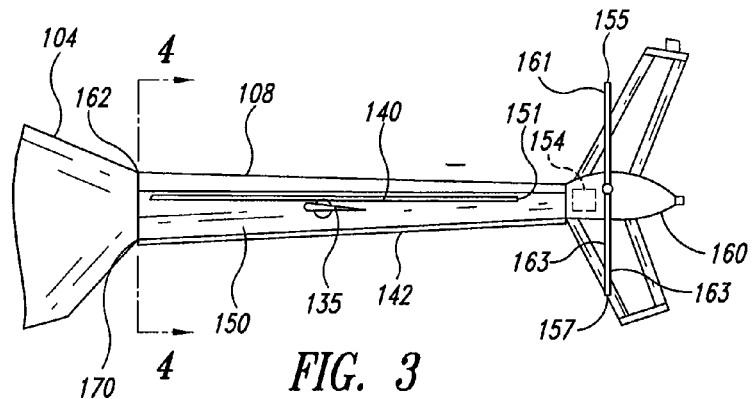
FIG. 3 is a side elevational view of a rear portion of a helicopter with a stabilizing system, according to one illustrated embodiment.
Figure 4:
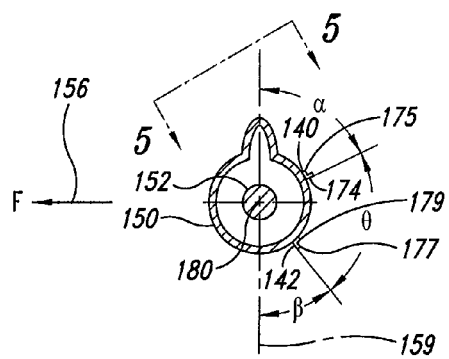
FIG. 4 is a cross-sectional view of the rear portion of the helicopter taken along line 4-4 of FIG. 3.

Referring to FIGS. 3 and 4, the tail section 108 includes a tail boom 150, a tail rotor drive shaft 152 within the tail boom 150, and a rotor drive assembly 154 (shown in phantom) that connects the drive shaft 152 to the tail rotor 116. The upper strake 140 and the lower strake 142 are fixedly coupled to and extend longitudinally along the tail boom 150. The tail boom 150 has a rearward end 160 that houses the rotor drive assembly 154 and carries the vertical stabilizer assembly 118 and a forward end 162 connected to the cabin fuselage section 104.

When the main rotor downwash flows around the tail section 108, the upper strake 140 and lower strake 142 cooperate to generate high and low pressure zones. These pressure zones result in a net force in a direction that is generally opposite to the direction of the reaction torque produced by the main lifting rotor 112. The illustrated upper and lower strakes 140, 142 of FIGS. 3 and 4 cooperate to produce a generally laterally directed force F, indicated by the arrow 156, that is generally perpendicular a vertical midplane 159 of the tail boom 150. The force F can also be at other orientations based on the desired aircraft aerodynamics and performance. The dimensions, configurations, and positions of the upper and lower strakes 140,142 can be selected to achieve the desired forces during flight.

In some embodiments, including the illustrated embodiment of FIG. 3, the horizontal stabilizer 135 is positioned generally midway with respect to a longitudinal length of the upper strake 140. Both the upper strake 140 and lower strake 142 extend continuously and uninterruptedly along the tail boom 150. The illustrated lower strake 142 has a longitudinal length that is greater than the longitudinal length of the upper strake 140. A rearward end 151 of the upper strake 140 is positioned generally laterally adjacent to tips 155, 157 of the rotor blades 161, 163, respectively, when the tail rotor 116 rotates. The lower strake 142 extends generally between the cabin fuselage section 104 and the vertical stabilizer 118. As shown in FIG. 3, the lower strake 142 includes a forward end 170 adjacent to the cabin fuselage section 104 and an opposing rearward end 172 positioned rearwardly of at least a portion of the vertical stabilizer 118.

The upper and lower strakes 140, 142 can be generally similar to each other and, accordingly, the following description of one of the strakes applies equally to the other, unless indicated otherwise. Referring to FIG. 4, the upper strake 140 includes a main body 174 and a mounting body 175 connected to the main body 174. The main body 174 is adapted to alter airflow to generate a desired force and extends outwardly from the tail boom 150. The main body 174 can be an elongate strip. The mounting body 175 is permanently or temporarily coupled to the tail boom 150. The illustrated lower strake 142 includes a main body 177 that extends outwardly from the tail boom 150 and a mounting section 179 connected to the main body 177 and coupled to the tail boom 150.

The positions of the upper and lower strakes 140, 142 relative to the tail boom 150 can be selected based on the desired torque compensation. The upper strake 140 of FIG. 4 is angularly offset from the midplane 159 by an acute angle α with respect to a longitudinal axis 180 of the tail boom 150. In some embodiments, the angle α is in a range of about 55° to about 75°. Such embodiments are well suited for generating a high pressure zone above the horizontal stabilizer 135. In some embodiments, the angle α is in a range of about 60° to about 65°. For example, the angle α can be about 62.5°. The illustrated lower strake 140 of FIG. 4 is angularly offset from the midplane 159 by an acute angle β. In some embodiments, the angle β is in a range of about 10° to about 30°. Such embodiments are well suited to generate desired compensation forces by altering flow of the main lifting rotor downwash without significantly altering handling characteristics when crosswinds flow around the tail boom 150. In some embodiments, the angle β is in a range of about 10° to about 20°. For example, the angle β can be about 15°. An angle θ between the upper and lower strakes 140, 142 relative to the longitudinal axis 180 can be in a range of about 75° to about 115°. In some embodiments, the angle θ is about 95° to about 105°. In some embodiments, the angle θ is about 100°. Other angles are also possible.

The mounting body 175 can be coupled to the tail boom 150 by one or more fasteners (e.g., nut and bolt assemblies, screws, rivets, and the like), welds, adhesives, combinations thereof, and the like. In some embodiments, the upper strake 140 is removably coupled to the tail boom 150 to allow for convenient strake replacement. If the upper strake 140 becomes damaged, it can be replaced with another strake. In some embodiments, the upper strake 140 is permanently coupled to the tail boom 150 via one or more welds to reduce or minimize the likelihood of separation between the upper strake 140 and the tail boom 150.

Figure 5:
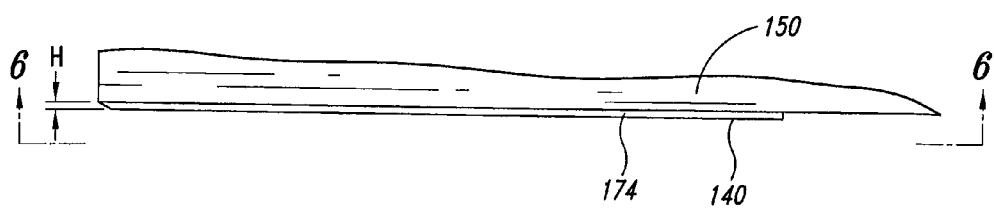
FIG. 5 is an elevational view of a tail boom and strakes along 5-5 of FIG. 4.
Figure 6:
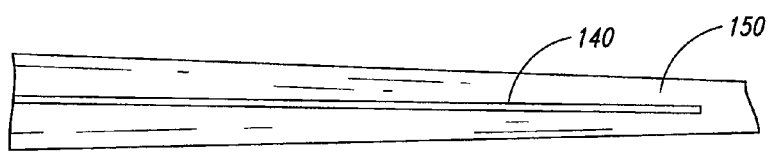
FIG. 6 is an elevational view of the tail boom and strakes along 6-6 of FIG. 5.

As shown in FIG. 5, the main body 174 of the upper strake 140 has a height H that is in a range of about 0.9 inch to about 1.2 inch. The height H can be increased or decreased to increase or decrease the pressure at the high pressure zone formed because of the main body 174.

The stabilizer system 110 can also include other types of strakes. U.S. Pat. No. 4,708,305 discloses various types of strakes, strake mounting configurations, and the like that can be incorporated into the helicopter 100 described herein.

Figures 7, 8:
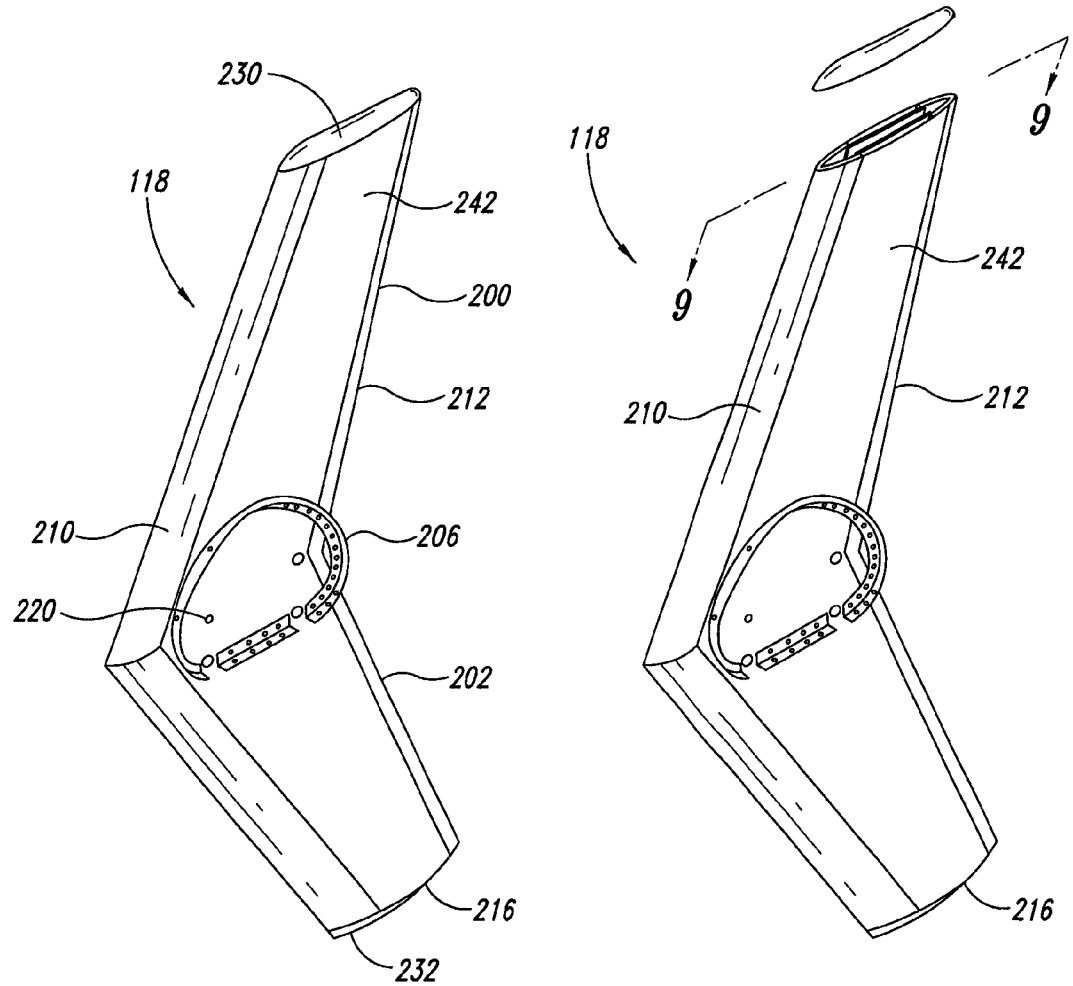
FIG. 7 is an isometric view of a vertical stabilizer, according to one illustrated embodiment.
FIG. 8 is an isometric, partial exploded view of the vertical stabilizer of FIG. 7, according to one illustrated embodiment.
Figure 9:
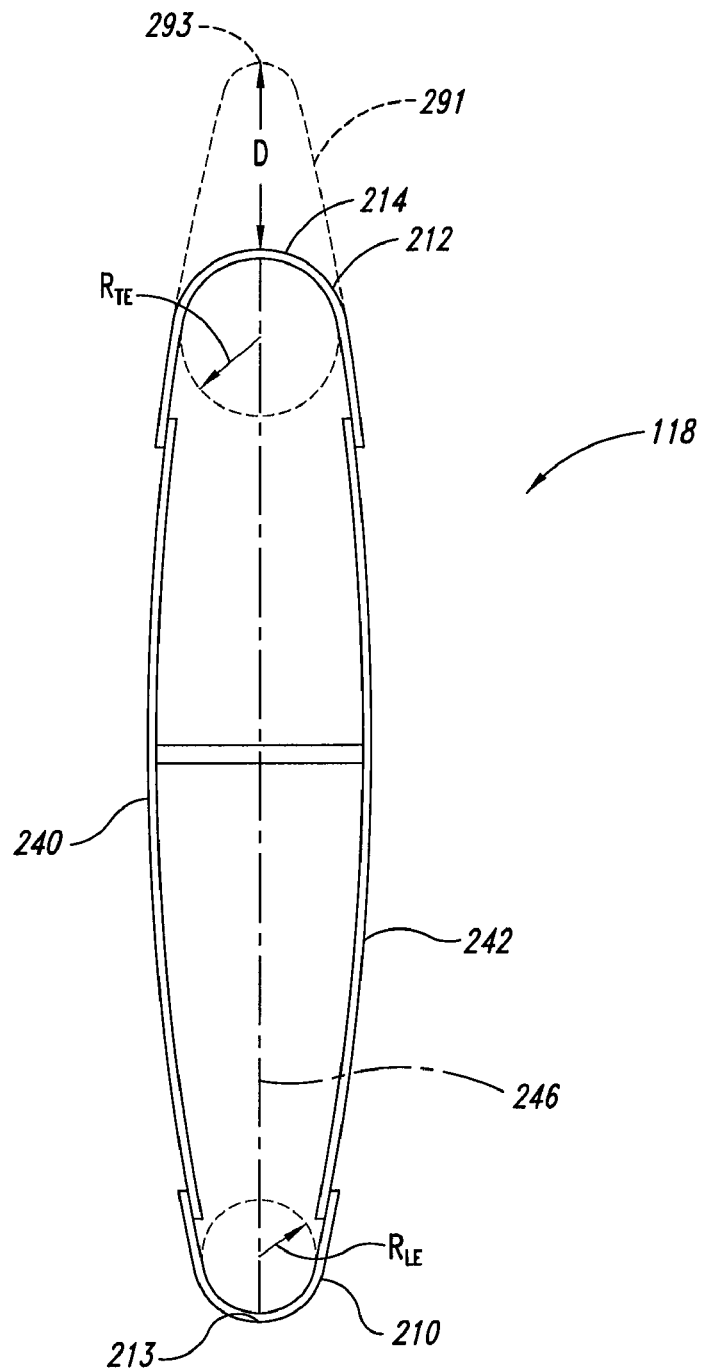
FIG. 9 is a plan view of the vertical stabilizer taken along line 9-9 of FIG. 8, according to one illustrated embodiment.

FIG. 7 shows the vertical stabilizer 118 that includes an upper fin 200, a lower fin 202 connected to the upper fin 200, and a mounting bracket 206 coupleable to the side of the tail boom 150. The vertical stabilizer 118 further includes a leading edge section 210, a trailing edge section 212, and a main body 216 extending between the leading edge section 210 and the trailing edge section 212. The leading edge sections 210 forms a leading edge 213 as shown in FIG. 9. The trailing edge section 212 forms a trailing edge 214 as shown in FIG. 9.

Referring to FIGS. 1 and 9, the upper fin 200 extends upwardly and rearwardly from the tail section 108. The lower fin 202 extends rearwardly and downwardly away from the tail section 108. The tail rotor axis of rotation 130 can extend through a central region 220 of the vertical stabilizer 118. The leading and trailing edge sections 210, 212 extend vertically past the tips 155, 157 of the tail rotor 116 when the rotor 116 rotates.

Referring to FIGS. 7-9, the vertical stabilizer 118 includes a first cambered surface 240 and a second cambered surface 242 that extend between the leading edge section 210 and the trailing edge section 212. The illustrated cambered surfaces 240, 242 are convex outwardly from a chord 246 of the vertical stabilizer 118. The curvature of the cambered surfaces 240, 242 can be selected based on the desired airflow when the helicopter 100 travels forward at a high speed.

The leading and trailing edge sections 210, 212 extend vertically between an upper end 230 and a lower end 232 of the vertical stabilizer 118 and can have relatively blunted shapes. The leading edge section 210 can have a leading edge radius $R_{LE}$ that is greater than, equal to, or less than a trailing edge radius $R_{TE}$ of the trailing edge section 212. In some embodiments, including the illustrated embodiment, the radius $R_{LE}$ is less than the radius $R_{TE}$. A ratio of the leading edge radius $R_{LE}$ to the trailing edge radius $R_{TE}$ can be in the range of about 0.5 to about 1.2. Such embodiments provide enhanced hovering capabilities because of similar flow characteristics during headwinds and tailwinds. In some embodiments, the ratio of the leading edge radius $R_{LE}$ to the trailing edge radius $R_{TE}$ is in the range of about 0.5 to about 1. Other ratios are also possible, if needed or desired.

The cord length 246 of the vertical stabilizer 118 can be selected based on the leading edge radius $RL_E$, trailing edge radius $R_{TE}$, desired compensation forces generated by the tail rotor 116, and the like. For example, in some embodiments, a ratio of the trailing edge radius $R_{TE}$ to the cord length 246 is in a range of about 0.5 to about 1.5.

Figure 10:
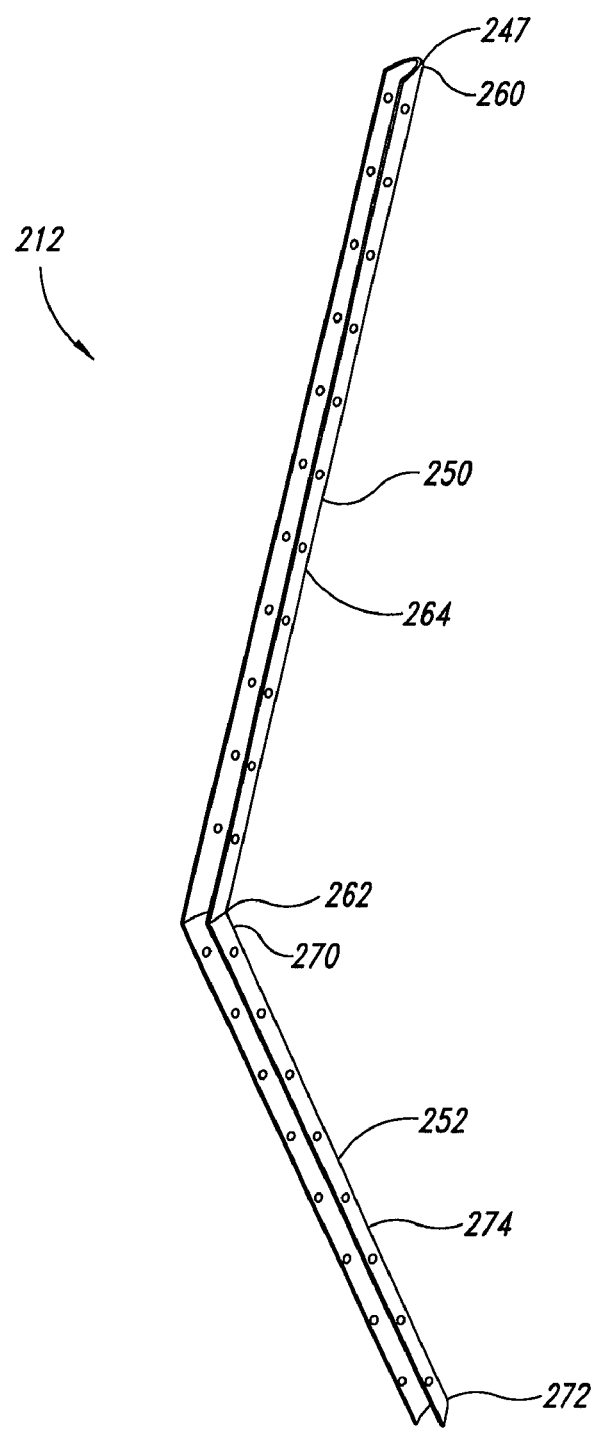
FIG. 10 is an isometric view of a trailing edge section for a vertical stabilizer, according to one illustrated embodiment.

FIG. 10 shows the trailing edge section 212 including an upper fin potion 250 connected to a lower fin portion 252. The upper fin potion 250 has an upper end 260, a lower end 262, and a main body 264 extending therebetween. The lower fin portion 252 includes an upper end 270, a lower end 272, and a main body 274 extending therebetween. The upper and lower fin portions 250, 252 define rearward portions of the upper and lower fins 200, 202, respectively.

The trailing edge section 212 can have a one-piece or multi-piece construction. In one-piece embodiments, the trailing edge section 212 can be monolithically formed using a machining process, extrusion process, molding process (e.g., injection molding process, compression molding, vacuum bag molding), vacuum forming (e.g., vacuum bag molding), combinations thereof, and the like. By way of example, the trailing edge section 212 can be made, in whole or in part, of one or more composites, polymers, and/or plastics that are molded into the desired shape. In multi-piece embodiments, the upper fin portion 250 can be temporarily or permanently coupled to the lower portion 252. For example, the lower end 262 can be welded or bonded to the upper end 270.

Referring to FIGS. 11-13, the upper fin portion 250 includes a first sidewall 280, a second sidewall 282, and a curved portion 284 extending between the first and second sidewalls 280, 282. If the upper fin portion 250 is coupled to the main body 216 (see FIGS. 7 and 8) using one or more fasteners, one or more holes can be formed in the first and second sidewalls 280, 282. Fasteners can be passed through the first and second sidewalls 280, 282 via the holes. If the upper fin portion 250 is coupled to the main body 216 using adhesives or welds, the first and second sidewalls 280, 282 may not have any holes.

As shown in FIG. 13, the upper fin portion 250 has a generally U-shaped cross-sectional profile taken perpendicularly to a longitudinal axis 283 of the upper fin portion 250. The illustrated curved portion 284 has an approximately semicircular shape. In other embodiments, the curved portion 284 has a partial elliptical shape, such as a semielliptical shape, or other arcuate shape. FIG. 8 shows the leading edge section 210 having a generally U-shaped cross-sectional profile. Thus, the trailing edge section 212 can have a wide range of different U-shaped cross-sectional profiles.

The lower fin portion 252 can be similar to the upper fin portion 250 of FIGS. 11-13. For example, the lower fin portion 252 can have a cross-sectional profile that is substantially geometrically congruent to the cross-sectional profile of the upper fin portion 250. The lower fin portion 252 and the upper fin portion 250 can cooperate to form substantially all of the trailing edge 214 of the vertical stabilizer 118. In some embodiments, the trailing edge section 212 forms a majority of the trailing edge 214. In some embodiments, the trailing edge section 212 forms at least 70%, 80%, or 90% of the total length of the trailing edge 214.

The trailing edge section 212 can be installed aftermarket or by an original equipment manufacture (OEM). For example, a vertical stabilizer can be retrofitted with the trailing edge section 212 to improve aircraft performance. The dashed lines of FIG. 9 show the location of the trailing edge before modification. The rearward section 291, including a sharp trailing edge 293, can be removed and replaced with the trailing edge section 212 so as to reduce the surface area of the vertical stabilizer 118. The distance D between the initial trailing edge 293 and the new trailing edge 214 can be at least 0.5 inch, 1 inch, 3 inches, 5 inches, or ranges encompassing such lengths.

Figure 14:
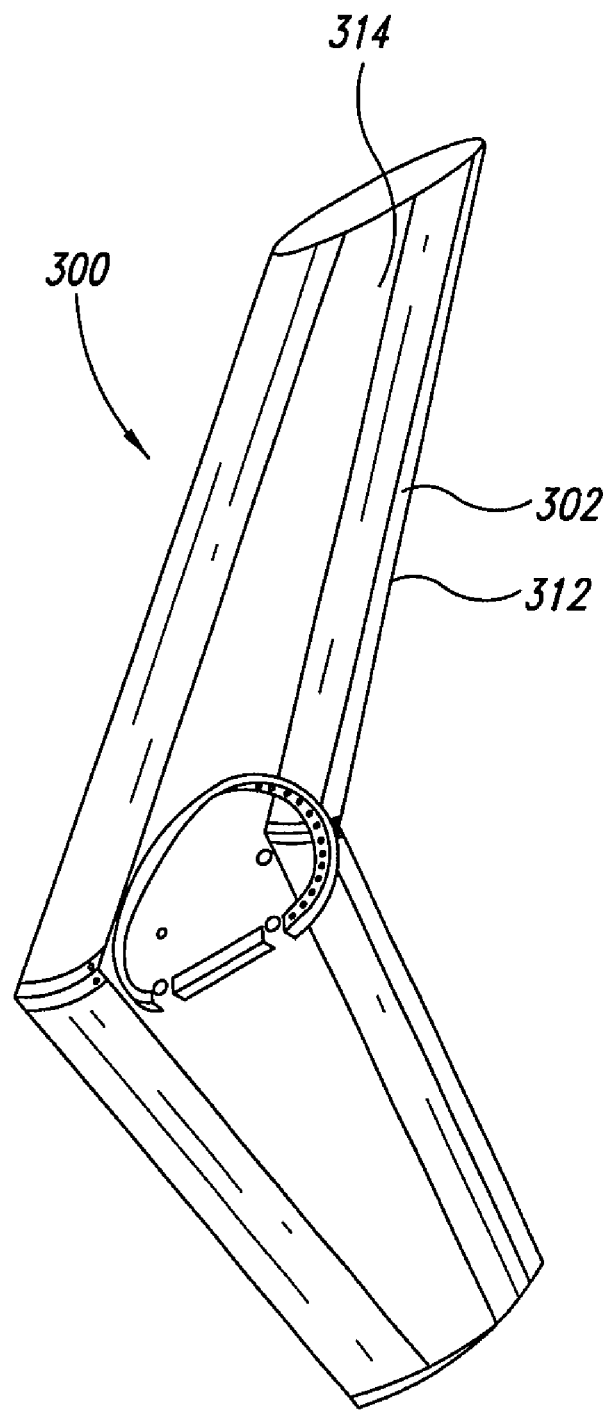
FIG. 14 is an isometric view of a vertical stabilizer with a V-shaped trailing edge, according to one illustrated embodiment.

FIGS. 14-18 show one retrofitting process for replacing the trailing edge of a vertical stabilizer. FIG. 14 illustrates a vertical stabilizer 300 that can be retrofitted with the trailing edge section 212. Generally, the non-rounded trailing edge 312 can be removed from a main body 314 of the vertical stabilizer 300. The rounded trailing edge section 212 can then be coupled to the main body 314.

Figure 15:
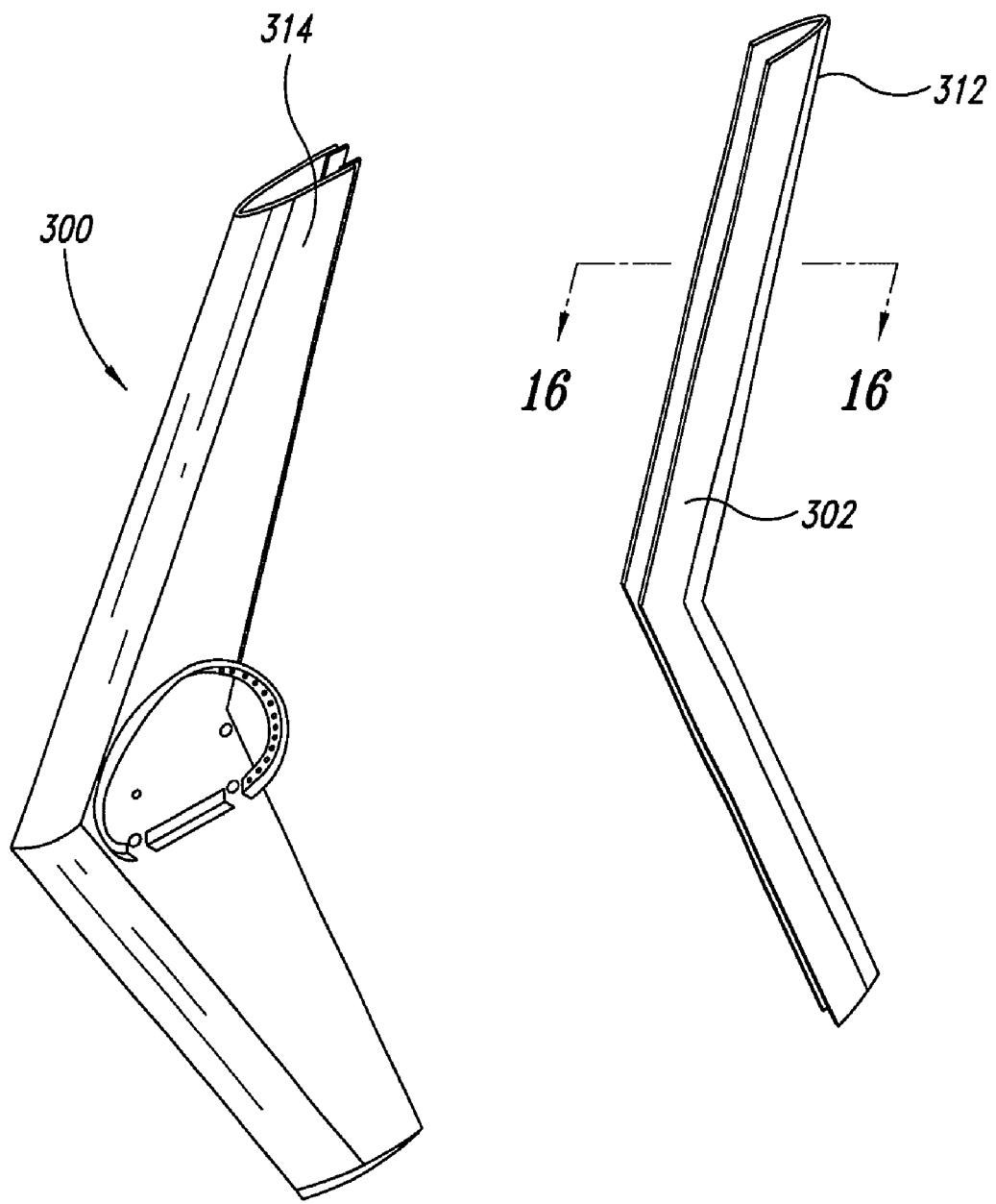
FIG. 15 shows a V-shaped trailing edge section separated from a main body of the vertical stabilizer, according to one illustrated embodiment.

A relatively slender non-rounded trailing edge portion 302, illustrated in FIG. 15, may block a sufficient amount of air pushed by the tail rotor so as to appreciably reduce thrust forces generated by the trail rotor. The trailing edge 312 can be replaced with the relatively blunt trailing edge section 212 to reduce the profile of the stabilizer 300, thereby increasing the thrust forcing generated by the rotor. The modified vertical stabilizer 300 can have a reduced profile (as viewed from the side), a reduced chord length, a reduced surface area, and the like. For example, an average chord length of vertical stabilizer 300 prior to the modification can be significantly greater than an average chord length of the vertical stabilizer 300 after the modification.

Figure 16:
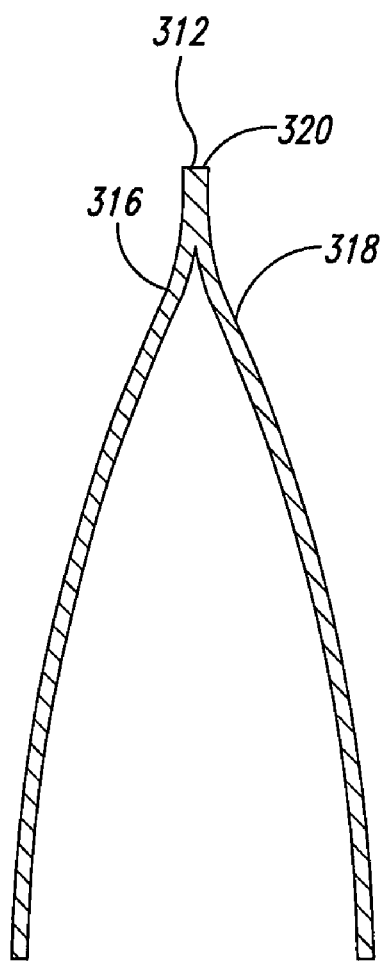
FIG. 16 is a cross-sectional view of the V-shaped trailing edge section taken along line 16-16 of FIG. 15, according to one illustrated embodiment.

As shown in FIG. 15, the trailing edge 312 is separated from the main body 314. The trailing edge 312 can have a generally V-shaped cross-section as viewed from above. As shown in FIG. 16, opposing sides 316, 318 of the trailing edge 312 converge together to form a relatively flat tip 320.

Figure 17:
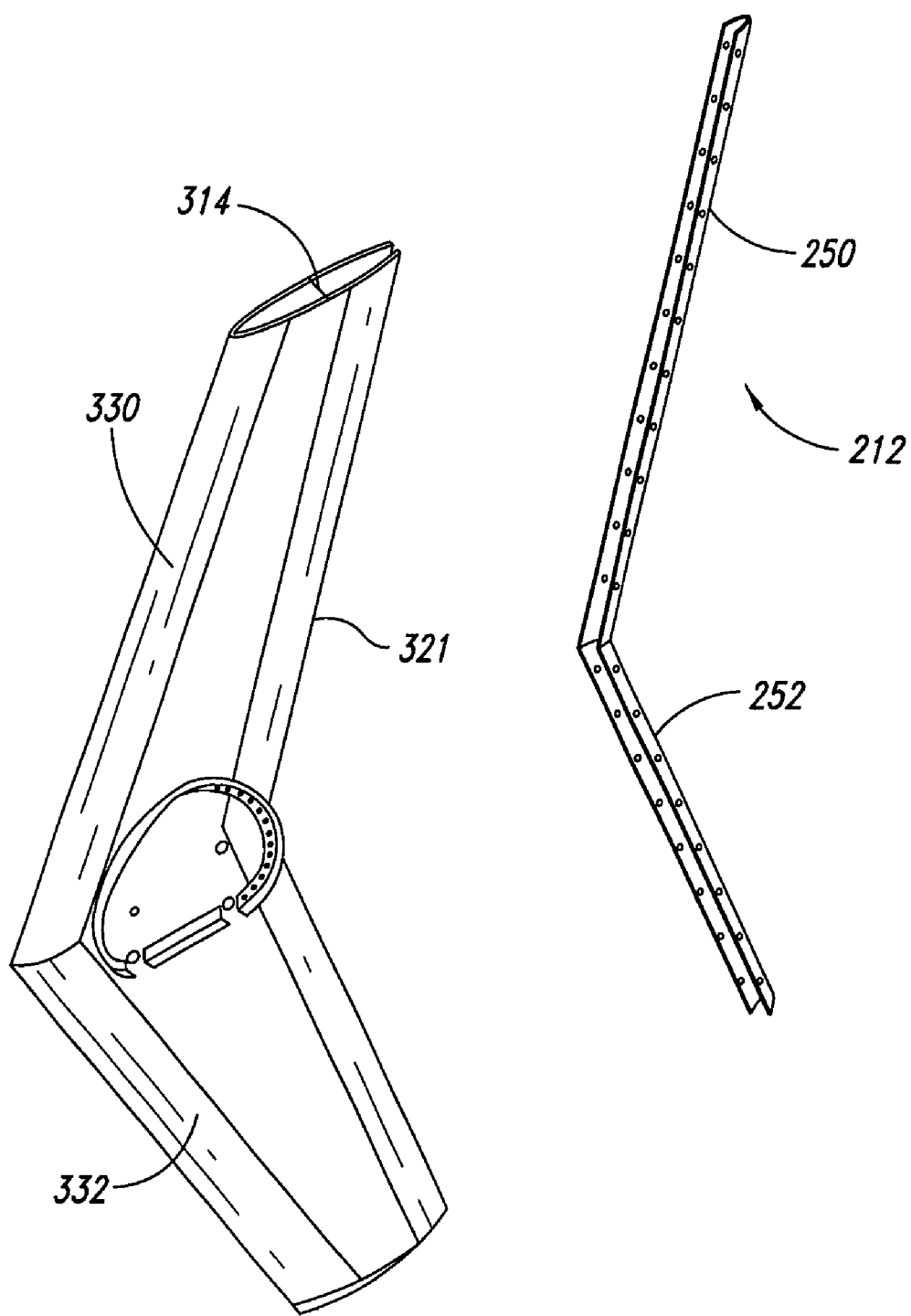
FIG. 17 is an isometric view of a rounded trailing edge section ready to be coupled to the main body of the vertical stabilizer, according to one illustrated embodiment.

After removing the trailing edge 312, the trailing edge section 212 can then be coupled to the main body 314. FIG. 17 shows the trailing edge section 212 spaced apart from and ready to be coupled to the main body 314. The trailing edge section 212 can be brought into contact with and coupled to the main body 314. The illustrated trailing edge section 212 has a unitary construction such that the upper and lower fin portions 250, 252 are simultaneously installed. Because the trailing edge section 212 and a side 321 of the main body 314 have complementary configurations, the trailing edge section 212 can mate easily with the side 321.

If the trailing edge section 212 has a multi-piece construction, the upper fin portion 250 and the lower fin portion 252 can be separately installed. For example, the upper fin portion 250 can be placed against and then fixedly coupled to the upper vertical fin 330. The lower fin portion 252 can be placed against and then coupled to the lower vertical fin 332. In this manner, the upper and lower fin portions 250, 252 can be separately installed on the main body 314.

Figure 18:
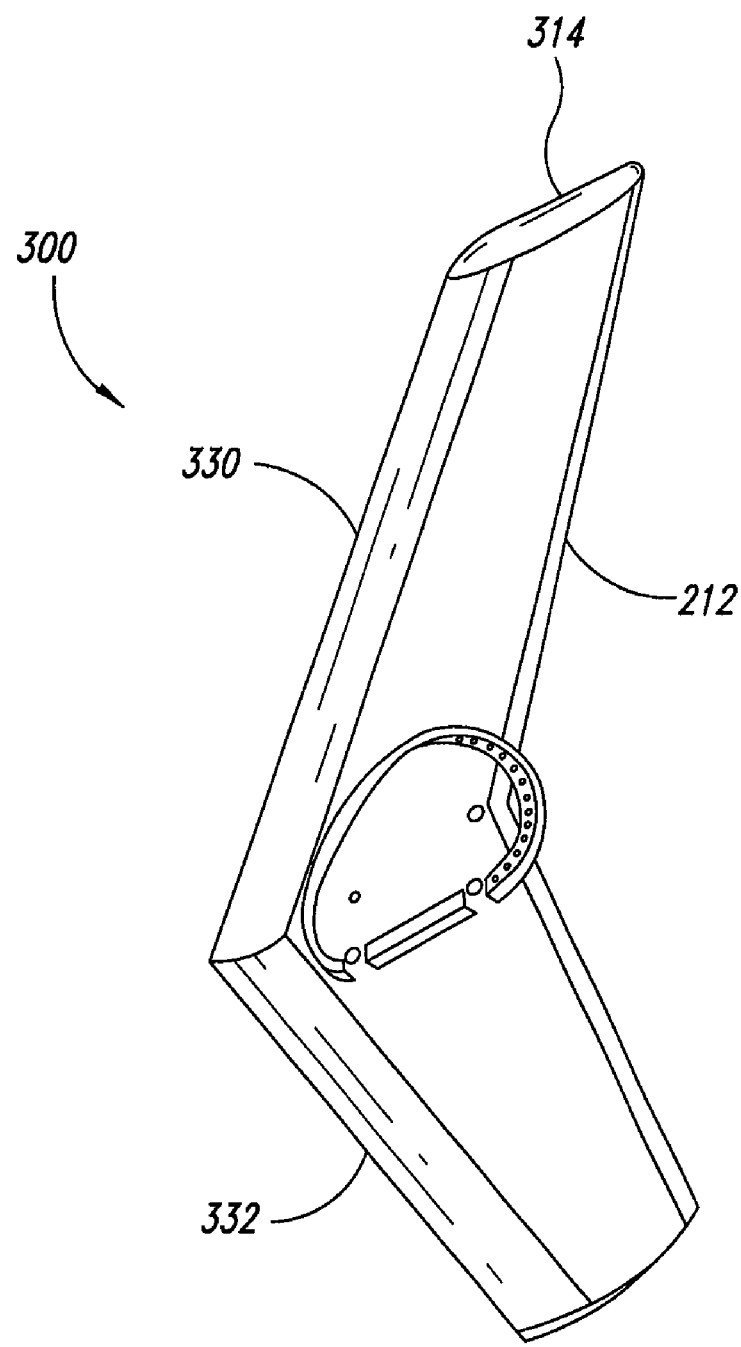
FIG. 18 is an isometric view of the vertical stabilizer of FIG. 17 after the rounded trailing edge section is coupled to the main body.

FIG. 18 shows the vertical stabilizer 300 with the trailing edge 312 fixedly connected to the main body 314. A first average chord length of the upper fin 330 prior to removing the non-rounded trailing edge 312 is greater than an average chord length of the upper fin 330 after coupling the trailing edge section 212 to the main body 314. An average chord length of lower fin 332 prior to removing the trailing edge 312 is greater than an average chord length of the lower fin 332 after coupling the trailing edge section 212 to the main body 314. In this manner, the chord lengths of different sections of the vertical stabilizer 300 can be reduced. The trailing edge section 212 of FIG. 18 can be removed from the main body 314 to install another trailing edge, even the previously removed trailing edge 312, to adjust the aerodynamics of the vertical stabilizer 330.

Figure 19:
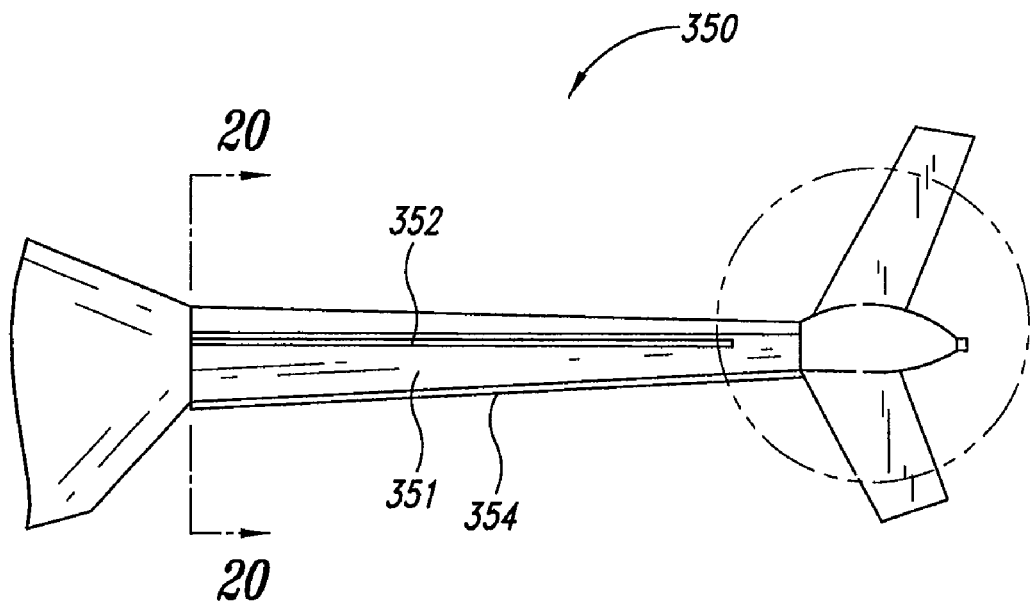
FIG. 19 is a side elevational view of a rear portion of a helicopter with a stabilizing system, according to one illustrated embodiment.
Figure 20:
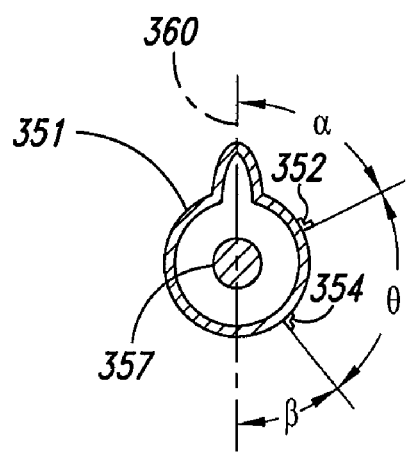
FIG. 20 is a cross-sectional view of a tail section and strakes of FIG. 19 taken along line 20-20.
Figure 21:
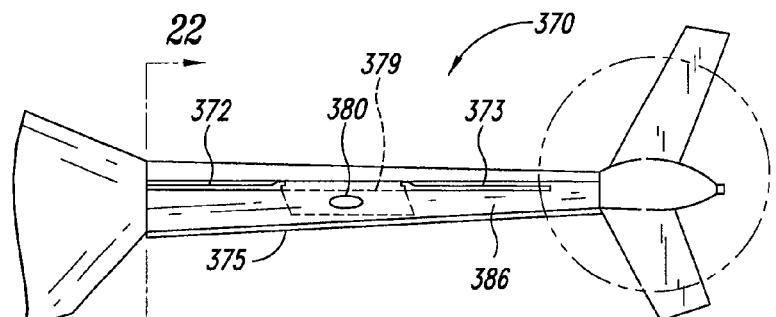
FIG. 21 is a side elevational view of a rear portion of a helicopter with a stabilizing system, according to one illustrated embodiment.
Figure 22:
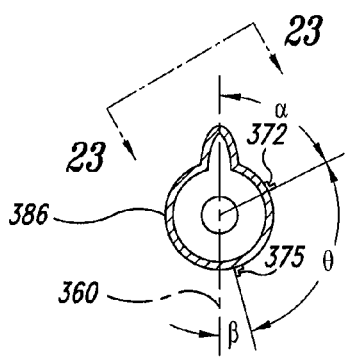
FIG. 22 is a cross-sectional view of a tail section and strakes of FIG. 21 taken along line 22-22.
Figure 23:
FIG. 23 is an elevational view of the tail section and strakes taken along 23-23 of FIG. 22.
Figure 24:
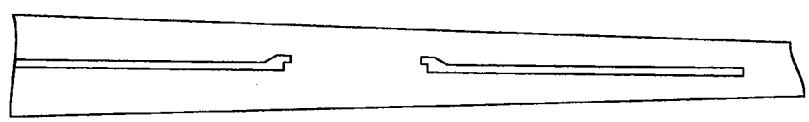
FIG. 24 is an elevational view of the tail section and strakes taken along 24-24 of FIG. 23.

FIGS. 19-24 show tail boom assemblies with different strake configurations. Referring to FIGS. 19 and 20, a tail section 350 without a horizontal stabilizer includes an upper strake 352 and a lower strake 354. An acute angle α between a vertical midplane 360 of a tail boom 351 and the upper strake 352 can be in the range of about 60° to about 70°. For example, the angle α can be about 65°. An acute angle β between the vertical midplane 360 and the lower strake 354 can be in the range of about 10° to about 20°. In some embodiments, the angle β is about 15°. The angle θ between the upper and lower strakes 352, 354 relative to a longitudinal axis 357 of the tail boom 351 is in the range of about 90° to about 110°. Other angles are also possible.

FIGS. 21-24 show a tail section 370 that is generally similar to the tail section 350 of FIGS. 19 and 20, except as indicated otherwise below. The tail section 370 includes a pair of spaced apart upper strakes 372, 373 and a lower strake 375. In some embodiments, a removable or permanent horizontal stabilizer 380 may be positioned longitudinally between the upper strakes 372, 373 along a tail boom 386. The illustrated horizontal stabilizer 380 is positioned below a gap 379 between the upper strakes 372, 373.

Figure 25:
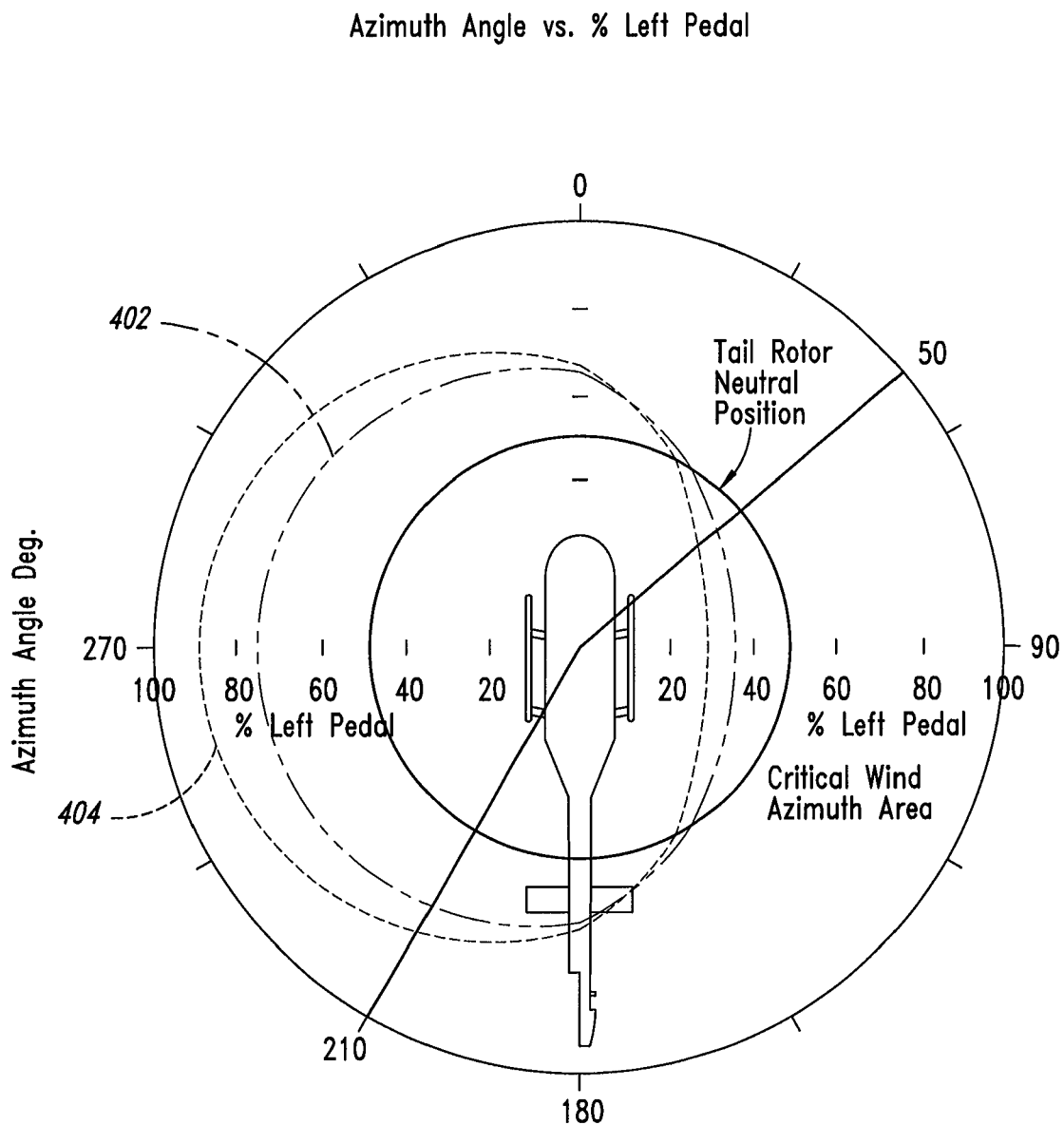
FIG. 25 shows azimuth angle versus a percent of left pedal used to maintain heading of an aircraft, according to one embodiment.

FIG. 25 shows azimuth angle versus a percent of left pedal used to maintain a generally constant heading for a Bell 206L Long Ranger Helicopter operating out of ground effect (OGE) and wind at 30 knots with a sea level air density. The Bell 206L Long Ranger Helicopter is sold by Bell Helicopter Company.

FIG. 25 shows that the percent of left pedal input used to adjust the pitch of the tail rotor can be reduced as compared to the unmodified helicopter. The data 402 corresponds to the helicopter with a stabilizer system. The data 404 corresponds to the conventional helicopter without a stabilizer system. For example, a pilot uses about 89% of the total available left pedal input for a cross wind of 30 knots at an angle of 270° for conventional Bell 206L Long Ranger Helicopter. By contrast, the Bell 206L Long Ranger Helicopter with the stabilizer system only requires 76% left pedal input. The strakes and reduced profile vertical stabilizer decrease the amount of left pedal input used compensate for reaction main rotor torque.

Figure 26:
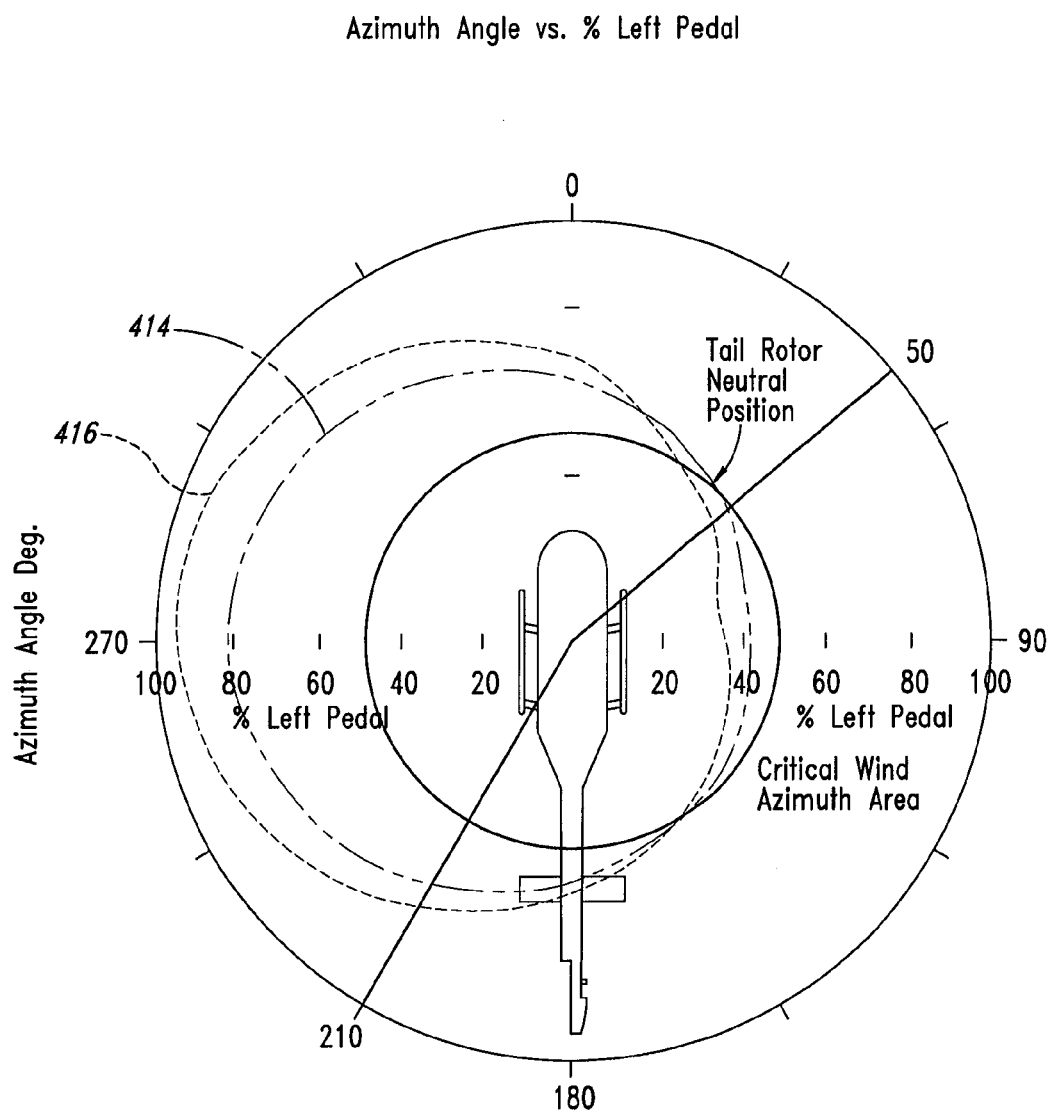
FIG. 26 shows azimuth angle versus a percent of left pedal used to maintain heading of an aircraft, according to one embodiment.

FIG. 26 shows azimuth angle versus the percent of left pedal used to maintain a generally constant heading for the Bell 206L Long Ranger Helicopter operating in ground effect (IGE) and wind at 30 knots with a sea level air density. The data 414 corresponds to the helicopter with a stabilizer system. The data 416 corresponds to the helicopter without a stabilizer system. The amount of left pedal remaining when cross winds approach from the left side of the helicopter is significantly greater when the vertical stabilizer is used.

The stabilizer systems disclose herein can be incorporated into a wide range of helicopters. As used herein, the term "helicopter" includes, without limitation, rotorcraft aircraft, rotary-wing aircraft, or other heavier-than-air aircraft that is lifted and sustained in the air horizontally by rotating wings or blades turning about a vertical axes using power supplied by an engine. For example, the Bell 206 helicopters are well suited for retrofitting with the stabilizer systems disclosed herein. The various embodiments described above can be combined to provide further embodiments.

All of the U.S. patents, U.S. patent application publications, U.S. patent applications, foreign patents, foreign patent applications and non-patent publications referred to in this specification and/or listed in the Application Data Sheet are incorporated herein by reference, in their entirety. The embodiments, features, systems, devices, materials, methods and techniques described herein may, in some embodiments, be similar to any one or more of the embodiments, features (e.g., strakes), systems, devices, materials, methods and techniques described in U.S. Provisional Patent Application No. 60/930,233 and U.S. Pat. Nos. 4,708,305; 6,869,045; and 7,063,289. In addition, the embodiments, features, systems, devices, materials, methods and techniques described herein may, in certain embodiments, be applied to or used in connection with any one or more of the embodiments, features, systems, devices, materials, methods and techniques disclosed in the above-mentioned U.S. Provisional Patent Application No. 60/930,233 and U.S. Pat. Nos. 4,708,305; 6,869,045; and 7,063,289. The above-mentioned U.S. Provisional Patent Application No. 60/930,233 and U.S. Pat. Nos. 4,708,305; 6,869,045; and 7,063,289 are hereby incorporated by reference herein. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method of modifying a helicopter, the method comprising:
    removing a first upper trailing edge of an upper fin of a vertical stabilizer, the upper fin extending upwardly from a tail boom of the helicopter and the upper fin of the vertical stabilizer having a first upper fin average chord length prior to removing the first trailing edge;
    forming a second upper trailing edge of the upper fin so that the vertical stabilizer has a second upper fin average chord length that is less than the first upper fin average chord length;
    removing a first lower trailing edge of a lower fin of the vertical stabilizer, the lower fin extending downwardly from the tail boom of the helicopter and the lower fin of the vertical stabilizer having a first lower fin average chord length prior to removing the first trailing edge;
    forming a second lower trailing edge of the lower fin so that the vertical stabilizer has a second lower fin average chord length that is less than the first lower fin average chord length; and
    coupling at least one strake to the tail boom such that the at least one strake generates a force by altering a main lifting rotor downwash so as to at least partially counteract a reaction torque produced by a main lift rotor of the helicopter.

2. The method of claim 1, wherein forming the second upper trailing edge comprises coupling a U-shaped upper trailing edge section to a main body of the upper fin after removing the first upper trailing edge so as to increase a thrust force generated by a tail rotor adjacent to the vertical stabilizer.

3. The method of claim 1, wherein forming the new second lower trailing edge comprises coupling a U-shaped lower trailing edge section to a main body of the lower fin after removing the first lower trailing edge so as to increase a thrust force generated by a tail rotor adjacent to the vertical stabilizer.

4. The method of claim 1, wherein the coupling at least one strake to the tail boom includes:
    coupling an upper strake to the tail boom such that a first angle between a vertical midplane of the tail boom and the upper strake is in a range of about 60 degrees to about 70 degrees; and
    coupling a lower strake to the tail boom such that a second angle between the vertical midplane of the tail boom and the lower strake is in a range of about 10 degrees to about 20 degrees.

5. The method of claim 1 wherein coupling at least one strake to the tail boom includes:
    coupling an upper strake and a lower strake to the tail boom such that an angle between the upper strake and the lower strake with respect to a longitudinal axis of the tail boom is in a range of about 90 degrees to about 110 degrees.

6. The method of claim 1, wherein an upper trailing edge section defines the second upper trailing edge and a lower trailing edge section defines the second lower trailing edge, at least one of the upper trailing edge section and the lower trailing edge section has a longitudinal axis and a substantially uniform U-shaped cross-sectional profile along the longitudinal axis, wherein the U-shaped cross-sectional profile is taken perpendicularly to the longitudinal axis.

7. The method of claim 6, wherein the upper trailing edge section and the lower trailing edge section are monolithically formed together.

8. A method of modifying a helicopter, the method comprising:
    reducing an average chord length between a leading edge and a trailing edge of a vertical fin of a vertical stabilizer of a helicopter by modifying the trailing edge of the vertical fin, the trailing edge of the vertical fin including at least one section that extends vertically past tips of a rotor of the helicopter and reducing the average chord length includes reducing a chord length between the leading edge and the trailing edge of the vertical fin in the at least one section; and
    coupling at least one strake to a tail boom of the helicopter such that the at least one strake is positioned between an end of the tail boom carrying the vertical stabilizer and a fuselage of the helicopter.

9. The method of claim 8, wherein modifying the trailing edge of the vertical fin includes cutting away a rearward portion of the vertical stabilizer.

10. The method of claim 8, wherein modifying the trailing edge of the vertical fin includes modifying an upper fin that extends upwardly from the tail boom of the helicopter and modifying a lower fin that extends downwardly from the tail boom of the helicopter.

11. The method of claim 8, wherein modifying the trailing edge of the vertical fin includes replacing a non-rounded trailing edge with a rounded trailing edge.

12. The method of claim 11, wherein non-rounded trailing edge is V-shaped.

13. The method of claim 11, wherein rounded trailing edge is U-shaped.

* * * * *